US008620911B2

(12) United States Patent
Simske et al.

(10) Patent No.: US 8,620,911 B2
(45) Date of Patent: Dec. 31, 2013

(54) DOCUMENT REGISTRY SYSTEM (75) Inventors: Steven J. Simske, Fort Collins, CO (US); Chris Coughlan, Co. Galway (IE); Mark Jacobsen, Moycullen (IE); Mick Keyes, Templeogue (IE); Gary Moloney, Corofin (IE)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/634,764

(22) PCT Filed: Apr. 29, 2010

(86) PCT No.: PCT/US2010/033014
§ 371 (c)(1),
(2), (4) Date: Sep. 13, 2012

(87) PCT Pub. No.: WO2011/136782
PCT Pub. Date: Nov. 3, 2011

(65) Prior Publication Data
US 2013/0036127 A1  Feb. 7, 2013

(51) Int. Cl.
*G06F 7/00* (2006.01)
(52) U.S. Cl.
USPC ......................................... 707/728
(58) Field of Classification Search
USPC ......................................... 707/728
See application file for complete search history.

(56) References Cited

U.S. PATENT DOCUMENTS

| 7,373,310 | B1 | 5/2008 | Homsi |
| 7,667,604 | B2 | 2/2010 | Ebert et al. |
| 2002/0111885 | A1 | 8/2002 | Geiger et al. |
| 2004/0039726 | A1 | 2/2004 | Shimizu et al. |
| 2004/0261017 | A1 | 12/2004 | Perry |
| 2006/0212366 | A1 | 9/2006 | Holland et al. |
| 2006/0265201 | A1 | 11/2006 | Martin |

(Continued)

FOREIGN PATENT DOCUMENTS

| JP | 2003228647 | 8/2003 |
| JP | 2004252794 A | 9/2004 |

OTHER PUBLICATIONS

"Identifying and Exploiting Provenance Authority in Provenance Data", http://priorartdatabase.com/IPCOM/000154183/.

(Continued)

*Primary Examiner* — Truong Vo (57) ABSTRACT

A document registry system (10) includes a registry database (20) with a specific task sub-database (22) and an analytics-supporting general task sub-database (24). The sub-databases (22, 24) include i) pre-existing fields configured to store, respectively, specific task-related and analytics-related document data received from one or more of a plurality of sources (S1, S2, S3, S4) or from a source (NS1, NS2) other than the plurality of sources (S1, S2, S3, S4), and ii) de novo fields configured tote generated as a result of, respectively, a specific task query and a general task query and configured to store, respectively, specific task-related and general task-related document data received from source(s) (NS1, NS2) other than the plurality of sources (S1, S2, S3, S4). A query mapping engine (26) is configured to receive a request entry, map the request entry into a query, and actively collect data based upon the query. Data is collected from the specific task sub-database (22) or the analytics-supporting general task sub-database (24), and from the source(s) (NS1, NS2) other than the plurality of sources (S1, S2, S3, S4).

19 Claims, 4 Drawing Sheets

(56) References Cited

U.S. PATENT DOCUMENTS

| | | |
|---|---|---|
| 2007/0101329 A1 | 5/2007 | Chen |
| 2007/0198533 A1 | 8/2007 | Foygel et al. |
| 2008/0027782 A1 | 1/2008 | Freire et al. |
| 2008/0114791 A1 | 5/2008 | Takatsu et al. |
| 2008/0209363 A1* | 8/2008 | Kuroda .................. 715/838 |
| 2009/0204897 A1 | 8/2009 | Sogge et al. |
| 2009/0240691 A1 | 9/2009 | Yano et al. |
| 2009/0251733 A1 | 10/2009 | Otsuji et al. |

OTHER PUBLICATIONS

Jihie, Kim et al, "Provenance Trails in the Wings/Pegasus System", http://www.isi.edu/~deelman/CCPE07-Provenance.pdf >; Publication date: 2007.

da Cruz, SMS et al, Provenance Services for Distributed Workflows: http://ieeexplore.ieee.org/xpl/absprintf.jsp?arnumber=4534258&page=FREE >; Publication date: May 19, 2008, pp. 526-533.

* cited by examiner

DOCUMENT REGISTRY SYSTEM

BACKGROUND

The present disclosure relates generally to a document registry system.

Companies and individuals often utilize document storage systems in order to electronically manage and complete documents and workflows associated therewith. Some systems are closed to the company/individual (i.e., data can be selectively added to and retrieved from the system by the employee's of the company and/or by the individual), and other systems are open to a variety of companies/individuals data can be selectively added to and retrieved from the system by the employees of the various companies and/or by the various individuals) who subscribe to such a system. When the document storage system is open to a variety of users, many of the users may be involved in a single document workflow. In these instances, the documents themselves may be tied to a specific lifecycle (e.g., validation at point A, handoff to point B, validation at point B, etc.), or to a set of prescribed sequential activities that are to be performed. The provenance record (i.e., document pedigree) for such a workflow depends, at least in part, upon the specific lifecycle and the processing/handling of the document in accordance with this lifecycle.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity reference numerals or features having a previously described function may or may not be described in connection with other drawings in which they appear.

DETAILED DESCRIPTION

Embodiments of the document registry system disclosed herein include a platform for document workflow management and completion, and a ubiquitous on-ramp to analytics and enterprise data from both subscribers and non-subscribers to the system. The system disclosed herein enables document uploading and processing at one or more subscriber nodes (depending, at least in part, upon security settings and access rules for a particular user). Beyond routine document management, the system disclosed herein also allows a workflow to be interrogated at any subscriber node. Based, at least in part, upon this interrogation, the system per collection and analysis of information both the system and outside of the system. This information (or other information derived from the collected and analyzed information) may subsequently be associated with the document at that node, or in some instances, at another node. This analysis may result in the addition of information to, the deletion of information from, and/or the replacement of information in the workflow; and/or the identification of incorrect or missed document processing at any particular node. As such, the system disclosed herein may assist in creating an accurate provenance record (i.e., history) of a document based workflow. The embodiments of the document registry system disclosed herein may be used to manage document based compliance, auditing, and workflow progress and completion, as well as to perform other document-related enterprise or consumer/brand relevant tasks (e.g., brand protection/anti-counterfeiting efforts and customer/brand interaction).

As used herein, the phrases "document based workflow" or "workflow" refer to an automated process during which documents, information, or tasks are passed from one participant to another for action or informative purposes, according to a set of procedural rules. Workflows include imaging workflows (e.g., quality assurance, authentication, forensics, etc.), supply chain workflows (e.g., track and trace, inspection, shipping/receiving, recall, etc.), environmental or sensor data monitoring workflows, or other suitable workflows (e.g., statistics [e.g., inventory, average time at a node, etc.], compliance, auditing, etc.). In other words, a workflow is any defined set of tasks to complete associated with a document. A workflow provenance consists of a template outlining the history of the documents/information/tasks and any actions taken or information received pertaining to the workflow. The provenance maps, and in some instances links, the various elements of the workflow together. In one exams e, the workflow provenance is a full, auditable log of all of the tasks completed in the workflow along with associated information (e.g., who performed the tasks, digital signatures therewith, etc.). Also as used herein, a "node" refers to a then-current state in the workflow. In one embodiment, if a document moves from a creator to an editor to a subscriber, the respective nodes are, for example, creation, editing, and receiving. At any instance, the node corresponds with a current version of a document (e.g. a composite document, or a document including several items (e.g., PDFs, PPTs, DOCS, etc.)). It is to be understood that nodes can also be in parallel, for example, when multiple recipients need to acknowledge receipt.

Figure 1:
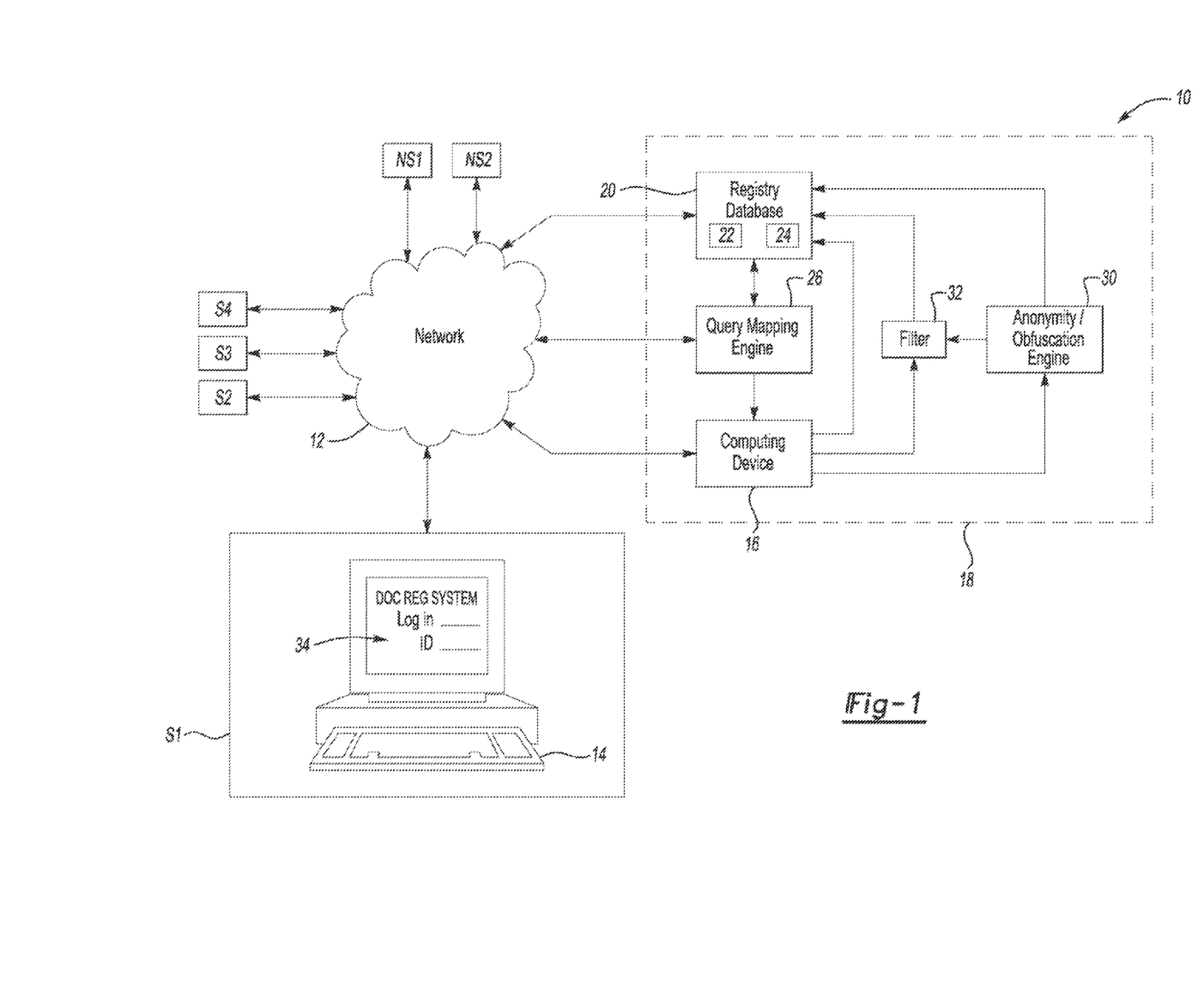
FIG. 1 is a schematic diagram of an embodiment of a document registry system.

Referring now to FIG. 1, a schematic diagram of an embodiment of the system 10 is depicted. Each system 10 component will be described briefly in reference to FIG. 1, and the functions of the components will be described in detail in reference to FIGS. 2, 3 and 4A through 4C.

The system 10 includes a cloud computing network 12, which is a virtualized bank of computers (e.g., processors and/or servers) that enables Internet-based computing. Via the cloud network 12, shared resources, software and information are provided to various computing devices 14, 16 (whether stationary e.g., desktop computers) or mobile (e.g., laptop computers, netbooks, cellular phones, personal digital assistants (PDAs), etc.)) on-demand. The cloud computing network 12 allows the registry system provider (not shown) to deliver the document workflow management system 18 and its various services to subscribers S1, S2, S3, S4 online via another web service or software, such as a web browser. Software and data associated with the cloud computing network 12 are stored on servers and their associated memory (not shown).

As used herein, subscribers S1, S2, S3, S4 include those companies and/or individuals who sign up for one or more services offered by the owner/operator of a document workflow management system 18. Some subscribers S1, S2, S3, S4 are linked to one another because they alter the node of a workflow that the respective subscribers S1, S2, S3, S4 participate in. It is to be understood that the subscribers S1, S2, S3, S4 may or may not be aware of the other participants in a workflow. When the subscriber S1, S2, S3, S4 is a company, one or more individuals associated with the company may be provided with system 18 identification/authentication access criteria. Furthermore, the various individuals of a subscriber company given access to the system 18 may have different information access levels. These levels may be set (e.g., by a manager or other authority figure) during an initial signup period, and are saved, for example, in a profile associated with that subscriber in the database 20. These levels may also be set based upon the workflow in the subscriber S1, S2, S3, S4 takes pad (e.g., a participant in a clinical trial may not have access to records of other participants in the clinical trial). It is to be understood that users may be added and/or deleted, and that access levels of existing users may be changed by an individual at the subscriber having authority to make these changes. Access levels may also depend, at least in pail, upon the security policies, compliance/auditing rules (Sarbanes-Oxley, HIPAA, etc.), and other business rules of the subscriber S1, S2, S3, S4.

Also as used herein, non-subscribers NS1, NS2 include those companies and/or individuals who have not signed up or one or more services offered by the owner/operator of the document workflow management system 18. It is to be understood that non-subscribers NS1, NS2 may become subscribers S1, S2, S3, S4, and vice versa.

Subscribers S1, S2, S3, S4 gain access to the document workflow management system 18 via a web service (e.g., a website, webpage, etc.) that provides and displays an access point 34 into the system 18. For example, the access point 34 may be an on-line application that requires log-in, authorization, access rights, etc. The access point 34 may be accessed via any computing device 14 configured to link to the cloud computing network 12. While a single computing device 14 is illustrated in FIG. 1, it is to be understood that a single subscriber S1, S2, S3, S4 may have any number of computing devices 14. The access point 34 may include data entry fields that allow a user to enter personal (e.g., a login ID) and authenticating information (e.g., a password, a PIN, etc.). In other instances, the computing device 14 used to access the access point 34 may include other hardware which, for example, can receive and read a smart card for identification/authentication purposes, or can utilize biometrics for identification/authentication purposes. In the latter example, the device 14 includes or is operatively connected to equipment that takes repeated measurements of physiological and behavioral characteristics to verify the user's identity. Any identifying information entered via the access point 34 is transmitted via the cloud computing network 12 and is received by a back-end (networked) computing device 16 (e.g., a virtualized and/or redundant processor), which analyzes the information and either allows or denies the requesting user access to the system 18.

When the information received at the access point 34 is verified by the back-end computing device 16, the user is able to virtually enter the document workflow management system 18. The access granted will depend upon the previously mentioned security levels associated with the user requesting access, and in some instances, will also depend upon security setting(s) that are set directly from the nature of the access point 34 (e.g., requiring an https connection). Upon logging in the user may access one or more workflows that he/she is privy to, may access his/her or a company profile (if privy to such information), and/or may enter a request/search entry related to any document and/or workflow in the system 18. The request/search entry is entered from the computing device 14 using a set of privileged commands (e.g., in the case of a menu-driven access control system), a free text search (e.g., in the case of a search driven system), or other user interface front end filet is available once logged on to the system 18.

Some requests are atomic requests, or relate to a single workflow and/or a single aspect of that workflow. Other requests are molecular requests, which include two or more atomic requests (e.g., relate to multiple aspects of a single workflow). Still other requests are composite requests, which include atomic and/or molecular requests across multiple workflows. As non-limiting examples, the initial requests may relate to finding incomplete tasks in a workflow, out of sequence tasks in a workflow, non-legitimate field entries, overdue tasks, reasons for workflow rejections, statuses (e.g., archival status, current status of one or more documents (e.g., status of census documents), or the like), or any other desirable document and/or workflow related question.

The request entry is submitted to the document workflow management system 18, which includes a registry database 20 (which includes sub-databases 22 and 24), a query mapping engine 26, the computing device 16, an anonymity/obfuscation engine 30, and a filter(s) 32. It is to be understood that the components of the system 18 may be implemented in a consolidated location, or portion(s) of the system 18 may be implemented at different locations. It is to be further understood that each of these components is either directly or indirectly in operative communication with the cloud computing network 12, and includes respective software and/or programs that are configured to perform one or more operations of the document workflow management system 18, including one or more steps of the embodiments of the methods disclosed herein (see, e.g., FIGS. 2 and 3). Furthermore, while a single one of each component is shown in FIG. 1, the system 18 may include multiple query mapping engines 26, computing devices 16, anonymity/obfuscation engines 30, and filters 32.

The registry database 20 includes hardware for storing data associated with documents workflows, and also includes software for grouping this data in sub databases 22, 24 and for presenting this data in pre-existing fields (i.e., part of the original database or previously generated as a result of a query) or de novo fields (i.e., newly generated as a result of a query), both of which will be discussed further hereinbelow. The sub-database 22 is a specific task sub-database including fields that are allocated for containing data related to specific instantiations of a document workflow (e.g., information that is particularly related or tied to that document, personal information of a loan application, authorized purchasing amounts, etc.). The sub-database 24 is an analytics-supporting general task sub-database including fields that are allocated for containing data related to generic statistics, broad statuses, and/or percentages that are tangentially related to the document workflow (e.g., status of census, percentage of similar applications that have been approved, current workload of the individual who owns/has the document in its current state, the in/out office status of the individual who owns/has the document in its current state, estimated time of completion, analytics related to the completion of the workflow, etc.). It is to be understood that when data in the registry database 20 is presented to a user of the system 10, the data may be retrieved from one or both of the sub-databases 22, 24 and presented to the user in a predetermined format.

Data input into the database 20 may be organized such that a hierarchy of data exists. Query semantics tags may be assigned to the subscribers S1, S2, S3, S4 and/or to one or more workflows after the query is performed. Specific field(s)

of the workflow may be tagged/flagged, specific document(s) within the workflow may be tagged/flagged, and/or specific workflow(s) may be tagged/flagged in order to create the desired hierarchy. The query semantics tags may vary from the trivial to the arcane. As one non-limiting example, the query semantics tags may relate to certain text, such that any document within a particular workflow or the entire database is flagged if it contains that text. As another non-limiting example, the query semantics to may flag the 15 documents in the entire database 20 that are most similar in content to the document that is the subject of the query. The tags may be put in place by the user of the system 18 when logged in to his/her account. These tags/flags may be viewed by any other user that has access to the workflow(s) that are assigned the tags/flags and/or has access to the data that is assigned the tags/flags.

The query mapping engine 26 includes hardware and software configured to perform multiple tasks. More particularly, the query mapping engine 26 is the component of the document workflow management system 18 that receives the request and/or search entries from the one or more subscribers S1, S2, S3, S4. It is to be understood that the query mapping engine 26 may be configured to consistently, or at predefined intervals, scan for, and receive (when submitted) request entries from the computing device(s) 14. The query mapping engine 26 includes a memory (not shown) that is configured to queue a plurality of messages in date and time order. These messages may be retrieved by the engine 26 and acted upon in order of receipt. In some instances, a priority may be assigned to a request entry (e.g., received from a CEO of a company, related to an impending disaster, etc.) and this priority request may be generated prior to other request entries. When a request entry is acted upon, the query mapping engine 26 maps the request or search err into a suitable query which is based, at least in part, upon the access rules associated with the user who submitted the request/search entry.

Once the request/search entry is mapped into a suitable query, the query mapping engine 26 utilizes the generated query to search for information related to the query. The search is conducted in the database 20 (including sub-databases 22 and 24), in web sources dedicated to the system 18 (e.g., those contracted to submit data to the system 18), and in web sources associated with both the subscribers S1, S2, S3, S4 of the document workflow management system 18 and the non-subscribers NS1, NS2 of the document workflow management system 18. The web sources may be any multi-user, potentially multi-access level web-accessible registry, web-accessible database, web-accessible posting location, or other web-accessible salient host of information. In some instances, the web sources are associated with a website or a datastore that is web-accessible. Any of the sources may be satellite based, mobile network based, or the like. One non-limiting example of a dedicated web source is a web feed (i.e., a data format that provides users with frequently updated content). In a web feed, one or more content providers publish a feed link, to which the system 18 subscribes. The system 18 may include an aggregator (not shown) which asks (e.g., at predefined intervals or in response to a data collection triggering event, such as a request entry discussed further hereinbelow) all the servers in its feed list if they have new content. When new content is available, the aggregator will download the content and transmit it to computing device 16 for further processing. Any of the web sources may be searched via search-based interrogation techniques, such as for example, via search-engine interrogation, specific site scraping, or other like techniques. In one non-limiting example, the query mapping engine 18 searches web(s) services to find salient databases, inputs information based upon the query, and digests the resulting information.

The collected data is transmitted to the computing device 16, which alone or in conjunction with the anonymity/obfuscation engine 30 and/or the filter 32 is configured to process the data and generate output that is directly transmitted to the user (i.e., the originator of the request) and/or is used to update the database 20. In particular, the generated output may be used to change and/or update one or more fields in the database 20, thereby altering a workflow currently in the system 18. The computing device 16 is configured to generate analytics (e.g., which process raw data and generate logical data representations of the raw data) after performing one or more analyses on the data received from the query search. In one embodiment, the analysis performed will depend, at least in pad, upon the query used for the data search, and/or the format of the data received. As one example, well-formatted data (e.g., from a web feed or site syndication) that is suitable for insertion into the database 20 as received may not undergo much, if any, analysis, whereas non-formatted data may be re-mapped in order to generate suitable output for the database 20. In another embodiment, the analysis performed will depend, at least in part, upon the context of the node that is in place when the query is run. It is to be understood that different nodes of the workflow will have associated therewith different active analytics scripts (that are in place in and operable via the computing device 16) to interpret received information, often irrespective of the query used to obtain this information. As one example, when a query is initiated during the creation node of a document workflow, the analytic scripts run by the computing device 15 may be different than analytics scripts that are run when a query is initiated during the editing node of the same document workflow. More particularly, analytics scripts run when the node is "creation" may relate to, for example, checking for duplicate documents started by the same user for the same task/workflow, validating that the user has the right to begin the workflow, etc., and analytics scripts run when the node is "editing" may relate to, for example, checking for the number of tasks remaining for completion, validating input, validating decryption, logging changes, etc. In still another embodiment, the analysis performed will depend, at least in part, upon the access level of the user requesting the query, if any. For example, since a superuser may be allowed to edit all parts of a document, the analysis based upon a request from a superuser may involve the entire document; however, another user may only be allowed to read (i.e., not edit) or may not have some sections not visible on his/her screen, and thus the analysis may involve the generation of generic statistics (e.g., since the user cannot change data in the workflow) or may involve only those portions visible to the requesting user.

The analysis performed may also depend upon the reputation, reliability, ranking, etc. of the data producer (e.g., subscriber or non-subscriber), especially in instances where there is conflicting data. If there is no difference in reputation, ranking or reliability, than the most recent data is used first, or a moving average of ail data is used, or the like. As such, the analysis and presentation of the data may be altered if for example, the most trusted, reliable, highest then-currently ranked, etc. data provider changes the format/schema of the data it is presenting.

The analysis may not only take into account the data received as a result of the query, but may also combine the newly received data with one or more previous data sets to generate composite or emergent data based upon the combined data sets. As such, new analytics may be generated based upon the combination of the newly received data and older data already in the database 20.

The analysis can be geared toward a particular document at a particular node in a workflow. As one non-limiting example, the request entry may relate to the location of a particular document that needs to be signed by the person making the request entry. The generated query may be a specific task-related query that asks the sub-database 22 for any information about the current location of the document and once this information is retrieved, ii) asks subscriber and non subscriber sources for more specific information based upon the information that is received about the current location. As such, multiple queries may be generated in response to a single request entry. For example, the computing device 16 may receive information from the specific task sub-database 22, which indicates that the document was shipped to the particular person via a courier on Tuesday; and then may receive information from a non-subscriber NS2 website (e.g., a news website), which indicates that one of the courier's planes crashed Wednesday morning. Once the computing device 18 receives the data, it reviews the query to determine the type(s) of analysis that is/are to be performed. Since the additional information could impact the status of the location (which is the subject of the original request entry), the output generated may include a response to the request (i.e., document shipped via courier on Tuesday) and also an alert about the courier's plane crash.

The anonymity/obfuscation engine 30 is in operative communication with the computing device 16, and is configured to anonymize the analytics and/or output generated by the computing device 16. The anonymity/obfuscation engine 30 receives the generated analytics and/or output when the access level of the user does not enable him/her to see certain information contained in the analytics and/or output. For example, if an engineer logs into the system 18 and notices that a purchasing budget associated with his project is incorrect, his request entry may ask who approved the purchasing budget. If the engineer's access level requires that he is not privy to this information, the anonymity/obfuscation engine 30 may ensure that the generated output include a generic message (e.g., "a manager approved the purchasing budget" or "you do not have access to such information").

The filter(s) 32 is/are also in operative communication with the computing device 1 (and the anonymity/obfuscation engine 30), and is configured to aggregate, categorize, and/or classify the analytics and/or output generated by the computing device 16. A set of rules may be associated with the filter 32 that enables it to search the received data for keywords and information associated with the keywords. For example, the filter 32 may scan for specific analytics triggering or indexing terms, such as "signature", "approved", "rejected", "re-apply", "cancelled", etc. in order to re-structure the output of the analysis into presentable form for the user, taking into any access rights associated with the particular user. As such, the filter 32 allows salient data 10 be retained and disregards irrelevant data.

Using the anonymity/obfuscation engine 30 and the filter(s) 32, any data (whether the result of a single query or multiple queries) may be anonymized, aggregated, obfuscated, and/or otherwise sanitized for a particular user (e.g., lower-priority employee of a subscriber, an end user not privy to details of specific documents, etc.).

The computing device 1 then inputs the generated output to appropriate fields in the database 20. In some instances, the generated output (e.g., raw data or logical representation of raw data using analytics) does not fit into a pre-existing field, and thus de novo fields are generated and populated with this information. In other instances, the output requires removal of information in current fields, or removal of the fields themselves, and thus these fields may be depopulated or even deleted. In still other instances, the output renders information that is then-currently populated in one or more fields obsolete and/or incorrect, and thus the output may be used to repopulate these pre-existing fields. As such, the set of database 20 fields can grow, shrink, or remain the same after the query is run and analytics are provided.

When the database 20 is updated, it is to be understood that these updates may also affect one or more workflows upstream, downstream, and or at the point at which the database 20 is updated (e.g., at the node/current state that was in place when the request entry was submitted). In these instances, the computing device 16 can automate a process, a response, or an action for one or more users at the node or another node that is participating in the workflow and that is or could be affected by these updates. In the example previously discussed herein pertaining to the document and the courier, the computing device 16 may automate an action for the user which states that he should contact the courier service to determine if the document was on the crashed plane. More generally, the computing device 16, alone or in conjunction with the filter 32, can request action by an agent/actor/user in the workflow, including per additional tasks, increasing the rate of inspection/completion, or any other document related action item.

In addition to the output generated from a query, it is to be understood that the computing device 16 and the cloud computing network 12 are configured to post additional information to a users profile and/or one or more workflows based upon the levels of discretization of access control (i.e., security levels of user(s) associated with the profile and/or workflows). For example, the computing device 16 may add information regarding payment methods, new services, etc. to a user's profile that has access to make payments, add new services to the service plan, etc. Furthermore, the computing device 16 and the cloud computing network 12 may also publicly post information on the website hosting the access point 34. This information may be based upon general security levels, such that any person accessing the website is not given information that he/she is not entitled to receive. This information may be general information about the document workflow management system 18, services and corresponding prices, etc.

Figure 2:
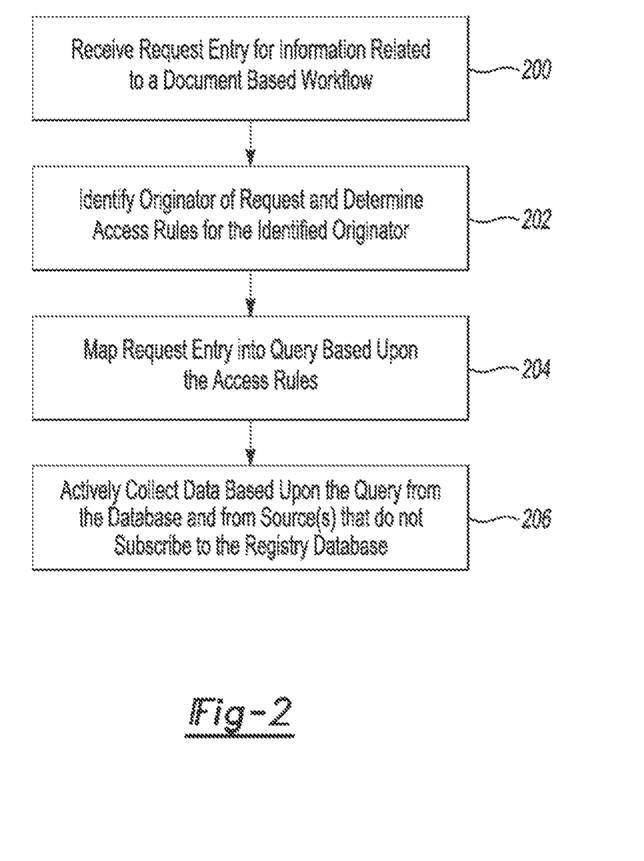
FIG. 2 is a flow diagram illustrating an embodiment of a method for responding to a request entry utilizing an embodiment of the document registry system.
Figure 3:
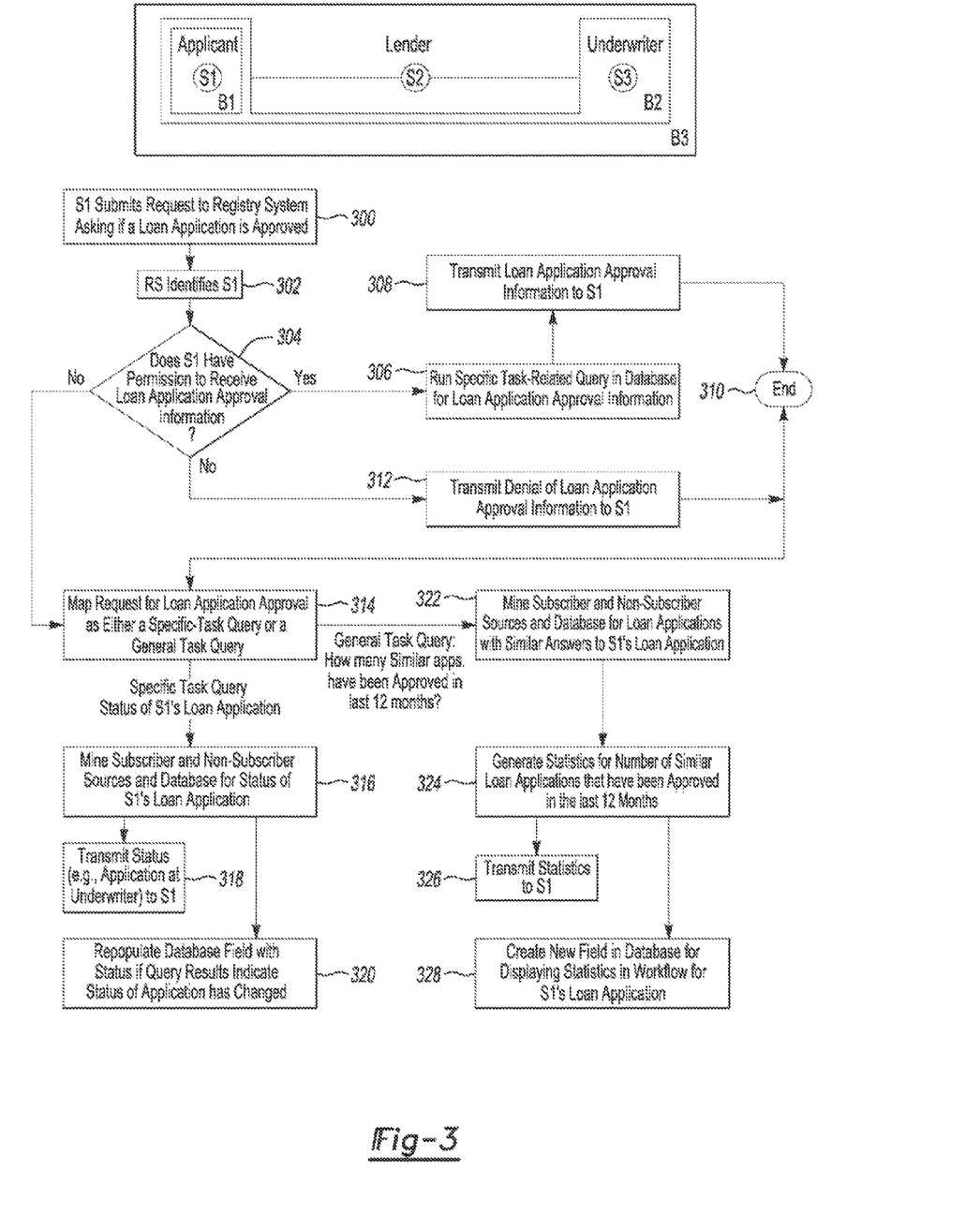
FIG. 3 is a flow diagram illustrating various embodiments of the method for responding to a request entry utilizing an embodiment of the document registry system.

FIGS. 2 and 3 now be referred to together. FIG. 2 illustrates a general embodiment of the method (which operates over the cloud computing network 12) for responding to a user's request entry, and FIG. 3 illustrates a specific non-limiting example of the method involving a loan application document workflow. In particular, the examples shown in FIG. 3 involve three subscribers, namely S1 (the loan applicant) S2 (the lender receiving the applicant's loan application), and S3 (the underwriter working with the lender). The boxes B1, B2, B3 shown in FIG. 3 schematically illustrate the security levels assigned to each of the subscribers S1, S2, S3. For example, the loan applicant (i.e., subscriber S1) has the lowest level of access to information in the document workflow (as illustrated by the smallest box B1), whereas the lender (i.e., subscriber S2) has the highest level of access (as illustrated by the largest box B2). It is to be understood that the workflow in FIG. 3 may include a multitude of documents, such as the can application, credit reports, bank documents, underwriter documents, etc., en and that the subscribers S1, S2, S3 will have access to different documents based upon their role in the particular workflow. For example, the applicant have not have access to on or more of the underwriter documents and the information associated with these documents (including, for example, the names of the individuals working on the loan application).

As illustrated at reference numeral 200 in FIG. 2, the method begins when the query mapping engine 26 receives the request entry from a user via his/her computing device 14 and the cloud computing network 12) for information related to a document-based workflow. In FIG. 3 (see reference numeral 300), the applicant submits a request entry to the system 18 asking if his/her previously submitted loan application has been approved.

Since the request originator (e.g., applicant) has been given access to the system 18, the computing device 16 has already identified and authenticated the originator via the credentials he/she provided to gain access to the system 18 (see reference numerals 202 and 302). The computing device 16 then determines the access rules for the request originator (e.g., applicant) by reviewing his/her profile stored in the database 20 (again see reference numeral 202). The computing device 16 uses the rules associated with the request originator to determine whether the request originator (e.g., applicant) has permission to receive the information identified in the request. In the example of FIG. 3, as shown at reference numeral 304, the computing device 16 looks up and processes the rules associated with the applicant, and determines whether or not he/she has permission to receive the request can application approval information.

As shown in FIG. 3, when the applicant does have permission to receive the requested information, the query mapping engine 26 runs a query of the database 20 based upon the submitted request entry. In this particular example and as shown at reference numeral 306, the query mapping engine 26 runs a specific task-related query because the request entry relates to a particular instantiation of the workflow involving the applicant's can application. This particular query may be directed at the specific task sub-database 22 since the requested information is related to a specific task of the workflow and thus is likely to be logged into the specific task sub-database 22. It is to be understood that the query may also be run in the entire database 20 to cover an instance in which the on approval information has been improperly input into the database 20.

When the query mapping engine 26 receives the results of the search, the engine 26 transmits the results to the computing devise 16, which, in turn, transmits this information to the applicant/subscriber S1, as shown at reference numeral 308. In this particular example, the loan application approval method may be an approval, a denial, or message indicating that the application is still under review, depending upon the information the lender and/or underwriter has uploaded to the database 20 and/or any other information that is appropriate to the task state. In one embodiment the information may be transmitted via an email, a text message, a short service messaging (SMS) message, an instant message, or combinations thereof. This type of message may be sent to the user on his/her computing device 14 (or another electronic device associated with the user). In another embodiment, the computing device 16 may instruct the user to pull up (on the screen of his/her computing device 14) a provenance record of the loan application workflow and view a field (e.g., an "approval status" field) to view the requested information. After the date retrieved as a result of the query is transmitted to the user, the method may end, as shown at reference numeral 310. Alternatively (and not shown in FIG. 3), prior to the method ending, the query and the information sent as a consequence of the query may be logged into the database 20 for auditing and meta-analytics purposes.

Referring back to step 304 of FIG. 3 and now also referring to step 704 of FIG. 2, when the request originator does not have permission to receive the requested information, the query mapping engine 26 may be configured to map the request entry into a query that attempts to respond to the request without violating the access rules associated with the request originator (see reference numeral 314 of FIG. 3). The original request may be mapped into a specific task query, a general task query, or both a specific task query and a general task query. As briefly mentioned herein, the specific task query may be used when the original request is related to a specific instantiation of a document workflow, and the general task query may be used when the original request is related to statistics, statuses, or other information that is tangentially related to the document workflow. Both types of queries may be used simultaneously, and the information received may be anonymized and/or filtered for the request originator. In one non-limiting example, when the original request results in information being retrieved from the database 20, the resulting information from this query search can be used to query outside sources for more general and/or specific information.

As illustrated at reference numeral 206 of FIG. 2, after the query is generated, it/they is/are run on the various sources (e.g., database 20, subscriber sources, and non-subscriber sources), and any relevant data is actively collected. This data may be used to update the database 20, as will be discussed further herein in reference to the remainder of steps in FIG. 3.

Referring now to reference numerals 316 through 320 of FIG. 3, the query mapping engine 26 maps the applicant's request entry, regarding the loan application approval, into a specific task query. Since the applicant does not have permission to view the information about whether the application has actually been approved or denied, the query mapping engine 26 generates a query to determine the status of the application (i.e., where the application is then-currently located) in the approval process. While not specifically answering the request proposed by the applicant (because of his/her permission level(s)), this query may provide the applicant with some additional information that may not have been previously known.

The engine 26 will then use the mapped query to mine the database 20 as well as subscriber and non-subscriber sources for information related (either directly or tangentially) to the status of the applicant's loan application, as shown at reference numeral 316. The information gathered as a result of performing the query will be processed by the computing device 16, alone or in combination with the anonymity/obfuscation engine 30 sari for the filter 32, and transmitted to the applicant (i.e., the request originator) in some form.

In this particular example, the computing device 16 may receive information from the database 20 that the application was forwarded to the underwriter from the lender is email. This data may have been logged into the system 18, for example, by the lender upon transmission. The computing device 16 may also receive information from a non-subscriber website that the email hag been received in an inbox. This information may be used to deduce that the underwriter has the loan application, and the deduced information may be transmitted directly to the applicant using messaging techniques previously described as shown at reference numeral 318.

Figure 4A:
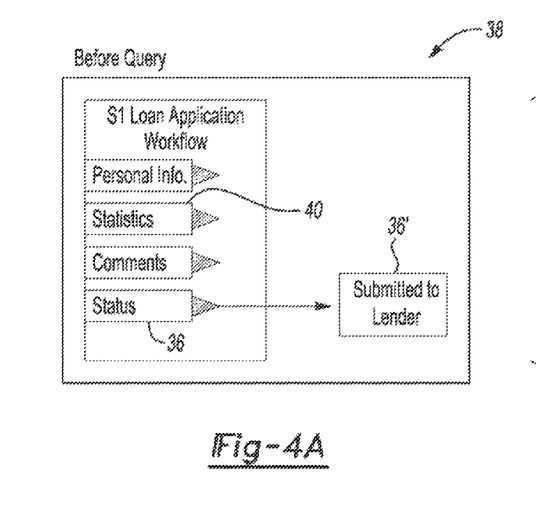
FIGS. 4A through 4C, are schematic diagrams illustrating examples of screen shots of a document workflow before and after various queries are run using an embodiment of the document registry system.

In other instances, the deduced information may be transmitted to the user via the system 18 (see, e.g., reference numeral 320). In these instances, the computing device 16 can cross-check this received information with the workflow information that is viewable by the applicant/request originator to determine if i) fields exist for this data, and ii) if these fields exist, whether these fields (e.g., the status field 36' shown in FIG. 4A) have been updated with the information. As illustrated in FIG. 4A, this particular example, even though the loan application document had been moved to the underwriter the status field 36' had not been updated in the database 20 at the applicant's screen 38. This may be due, in part, to the fact that i) field updates require acknowledgement (which is logged into the system 18) by both the lender and the underwriter that the document changed hand and only the lender uploaded the transmission information; or ii) other information (e.g., that the applicant is not privy to) may have been uploaded with the statuses of the transfer of the document (e.g., the name of the individual at the underwriter, the approval status, etc.) or iii) any other suitable reason.

Figure 4B:
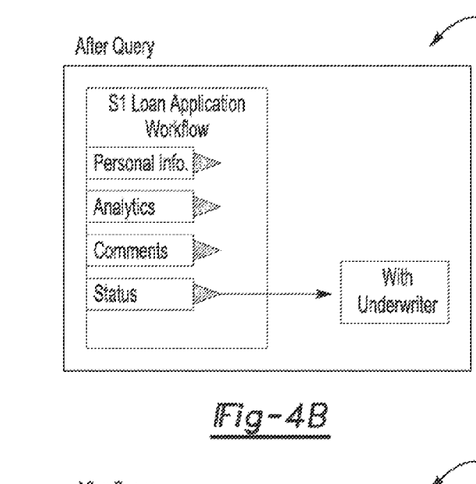

As previously described the information deduced from the query results illustrates that the document was received by the underwriter, and as illustrated in FIG. 4B the updated status information resulting from the query search may be transmitted to the applicant/subscriber S1 by repopulating the pre-existing "status" field 36' in the database 20 with the new information (see reference numeral 320). Since the user's security level allows access to this information, when he/she views the main page and/or a provenance record of the loan application workflow (which appears on the users screen when he/she requests such a record), the information will appear in the "status" field 36'. When a pre-existing "status" field 36' (or other field, depending upon the query) is not part of the database 20, the database 20 may create a de novo (i.e., new) field that is generated to have the status of the loan application populated therein. Again this information may be viewed by the user via the main page or the provenance record of the loan application workflow.

In this example, the query results also identified that the underwriter had not uploaded the proper acknowledgement into the system 18 to automatically generate the update of the field 36'. After updating the field 36' based upon the deduced information, the computing device 16 may also transmit a message to (either directly or via the workflow) an appropriate contact at the underwriter requesting him/her to upload an acknowledgement of the applicant's loan application to the system 18.

Referring now to reference numerals 314 and 322 through 328, instead of, or in addition to, mapping the request entry to a specific task query, the query mapping engine 26 maps the request entry to a general task query. Since the applicant does not have permission to view the information about whether the application has actually been approved or denied, the query mapping engine 26 generates a query to determine the how many similar applications have been approved in the last 12 months. This is one example of a general task query, and it is to be understood that any general query that relates to the request entry may be generated. In this particular example, the general task query may have been related to determining the average time for receiving approval of a loan application, or the like. Again, while not specifically answering the request proposed by the applicant (because of his/her permission level(s)), this query may provide the applicant with some additional information that may not nave been previously known.

The engine 26 will then use the mapped query to mine the database 20 as well as subscriber and non-subscriber sources for information related (either directly or tangentially) to the generated query, as shown at reference numeral 322. The information gathered as a result of performing the query will be processed by the computing device 16, alone or in combination with the anonymity/obfuscation engine 30 and/or the filter 32, and transmitted to the applicant (i.e., the request originator) in some form. For this particular search, the query will include information from the applicant's loan application to find similar applications both within the database 20 and at other subscriber and/or non-subscriber sources.

In this particular example, the computing device 16 may receive information from the database 20 that of all of the loan applications logged into the system 18, 5% of these applications had 70% or more of the answers in common with the applicant's application, and of those 5%, 3% percent were approved in the last twelve months, 1% were denied in the last twelve months, and 1% are sail pending. The computing device 16 may also receive information from a subscriber source (e.g., the lender's website), which advertises that its loan application approval rating is 85%. The computing device 16 may also receive information from a non-subscriber source (e.g., a news website) that reports that the lender is in financial trouble and has requested a loan from the federal government. The computing device 16 may run various analyses on the received information to generate output that is responsive to the general task query. For example, the information may be used to deduce that the applicant's loan application has a 75% change or less of being approved, as shown at reference numeral 324.

The deduced information (e.g., the statistics) may be transmitted directly to the applicant using messaging techniques previously described, as shown at reference numeral 326.

Figure 4C:
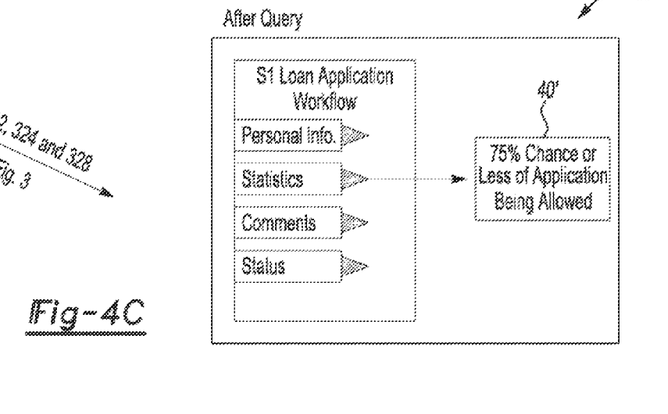

In other instances, the deduced information may be transmitted to the user via the system 18 (see, e.g., reference numeral 328). In these instances, the computing device 16 can cross-check this received information with the workflow information that is viewable by the applicant to determine if i) fields exist for this data, and ii) if these fields exist, whether these fields have been updated with the information. As illustrated in FIG. 4A, in this particular example, a statistics field 40 has been generated (e.g., the user has signed up for a statistic service), but does not include any information. As such, a de novo field 40' under the statistics field 40 may be generated to store the new statistics information. FIG. 4C illustrates the generation and population of the do novo field 40'. Since the user's security level allows access to this information, when he/she views the man page and/or a provenance record of the loan application workflow (which appears on the user's screen when he/she requests such a record), the information will appear in the "statistics" field 40'. When a pre-existing "statistics" field 40' (or other field, depending upon the query) is part of the database 20, the database 20 may repopulate this field 40' if the new information outdates the previous information. While FIG. 4C does not show the subfield 36 open, it is to be understood that since this data has not been altered as a result of the query described in steps 322, 324 and 328 of FIG. 3, this information is still available to the user if he/she clicked the status field 36 of the workflow.

Again referring back to step 304 of FIG. 3, when the request originator applicant in this particular example) does not have permission to receive the requested information, a denial may be transmitted to the request originator, as shown at reference numeral 312. Such a message may be flashed onto the user's computing device 14 screen so that he/she is informed immediately of the denial of his/her request or may be transmitted via any other suitable means (e.g., SMS message, email, etc.). This type of denial message may be sent when the query mapping engine 26 cannot map the request into another query, at least in part because the subject matter of the request is beyond the permitted access of the request originator. For example, if a contract lab technician at Company A requests information about the salary of Company A's chief executive officer (CEO), the information access level of the contract lab technician may be such that any financial information (even general or statistical information) related to Company A is not accessible using ha system 18. In this instance, the request cannot be remapped into a suitable query, and thus a denial message is immediately transmitted to the user. As illustrated in FIG. 3, after the denial message is sent, the method simply ends (as shown at reference numeral 310).

In still other instances, when the request originator (i.e., applicant in this particular example) does not have permission to receive the requested information, the denial may be transmitted to the request originator (as shown at reference numeral 312), and the query mapping engine 26 maps the request into a query that attempts to respond to the request without violating the access rules associated with the request originator, as shown and previously described at reference numerals 314 through 320, or 314 and 322 through 328.

While not shown in the Figures, it is to be understood that in still another embodiment when the user has permission to view the information requested in the original request entry, the system 1 may retrieve the requested information and then also map the request entry into another query in an attempt to gather additional information, for example, from non-subscriber sources NS1, NS2. This advantageously allows a workflow to be updated with information outside of the system 18 in response to an interrogation at a particular subscriber node. Still further, multiple queries may be run simultaneously. In one non-limiting example, the request entry may relate to legislation/regulations that are associated with a document workflow. In this example, a specific task query searching for current on-file regulations may be run in the database 20, and a general task query searching for any update(s) on such legislation/regulations may be run on non-subscriber websites. An information retrieved that corresponds to new rules associated with the legislation/regulations will be used to populate or re-populate the database 20. For example, if new tasks, inspection, etc. are required as a consequence of new regulations or because of real-time events bringing new exigencies, then the database 20 will be populated as a consequence.

Furthermore, while data fields and sub-fields are discussed herein, it is to be understood that the presentation of data may include pop-up menus and sub menus, graphs, charts, and/or any other format that is pre-selected by a user or is automatically selected by the computing device 16. As mentioned herein, the set of data presented to a particular user may be altered based upon the source of the data. For example, if there is no difference in reputation, ranking or reliability of the data provider, than the most recent data is used first, or a moving average of all data is used, or the like. As such, the presentation of the data may be altered if, for example, the most trusted, reliable, highest then-currently ranked, etc, data provider changes the format/schema of the data it is presenting.

While several embodiments have been described in detail, it will be apparent to those skilled in the art that the disclosed embodiments may be modified. Therefore, the foregoing description is to be considered exemplary rather than limiting.

What is claimed is:

1. A document registry system (10), comprising:
  a registry database (20), including:
    a specific task sub-database (22), including:
      pre-existing fields configured to store specific task-related document data received from one or more of a plurality of sources (S1, S2, S3, S4 or from a source other than the plurality of sources (NS1, NS2); and
      de novo fields configured to be generated as a result of a general task query and configured to store specific task-related document data received from the source other than the plurality of sources (NS1, NS2);
    an analytics-supporting general task sub-database (24), including:
      pre-existing fields configured to store general task-related document data received from one or more of the plurality of sources (S1, S2, S3, S4) or at least a second source other than the plurality of sources (NS1, NS2): and
      de novo fields configured to be generated as a result of a general task query and configured to store general task-related document data received from the source or the second source other than the plurality of sources (NS1 NS2); and
  a query mapping engine (26) configured to receive a request entry, map the request entry into a query, and actively collect data based upon the query from the specific task sub-database (22) or the analytics-supporting general task sub-database (24), and from the source or the it least a second source other than the plurality of sources (NS1, NS2).

2. The document registry system (10) as defined in claim 1, further comprising an anonymity or obfuscation engine (30) in operative communication with the registry database (20), the anonymity or obfuscation engine (30) configured to anonymize or obfuscate the collected data.

3. The document registry system (10) as defined in claim 1, further comprising a filter (32) in operative communication with the registry database (20), the filter (32) configured to at least one of process, categorize, or classify the collected data.

4. The document registry system (10) as defined in claim 1, further comprising:
  a computing device (14) configured to transmit the request entry; and
  a cloud computing network (12) configured to be accessible by the computing device (14) and configured to provide an access point (34) into a workflow management system (18) include the query mapping engine (26).

5. The document registry system (10) as defiled in claim 4 wherein the cloud computing network (12) is further configured to publicly post information based upon a general security love.

6. The document registry system (10) as defined in claim 4, wherein the cloud computing network (12) is further configured to post information based upon predetermined levels of discretization of access control.

7. The document registry system (10) as defined in claim 1, further comprising a computing device (16) configured to:
  i) receive the collected data; and
  ii) generate output, based upon the collected data, for one of a plurality of document-based workflows, the output affecting a condition of the one of the plurality of document-based workflows upstream, downstream, or at point at which the request entry is received.

8. The document registry system (10) as defined in claim 7 wherein the computing device (16) is configured to generate the output by at least one of:
   i) generating and populating the de nova fields of the specific task sub-database (22) or the analytics-supporting general task sub-database (24) based upon the collected data;
   ii) depopulating or deleting the pre-existing fields of the specific task sub-database (22) or the analytics-supporting general task sub-database (24) based upon the collected data; or
   iii) repopulating the pre-existing fields of the specific task sub-database (22) or the analytics-supporting general task sub-database (24) based upon the collected data.

9. The document registry system (10) as defined in claim 7, further comprising the plurality of sources (S1, S2, S3, S4), each of which subscribes to a workflow management system (18) and participates in at least one of the plurality of document-based workflows, and wherein the computing device (16) is further configured to automate at least, one of a process, a response, or an action related to a particular node of the at least one of the plurality of document-based workflows upstream, downstream or at the point at which the request entry is received.

10. The document registry system (10) as defined in claim 1, further comprising a hierarchy of the data in the registry database (20), the hierarchy being based upon a query semantics tag assigned to at least one of the plurality of sources (S1, S2, S3, S4) or a document-based workflow after the query is performed.

11. The document registry system (10) as defined in claim 1, further comprising:
   a source of the entry request; and
   data access rules associated with the source of the entry request;
   wherein the query mapping engine (26) is configured to map the query based upon the data access rules.

12. A method operating on a cloud computing network (12) for responding to a request entry, the cloud computing network (12) having instructions stored thereon, the instructions being executable to perform the steps of:
   receiving the request entry for information related to at least one document-based workflow;
   identifying an originator of the request entry;
   determining information access rules for the identified originator;
   mapping the request entry into a query, based upon the information access rules, for i) either a specific task sub-database (22) or an analytics-supporting general task sub-database (24) of a registry database (20) and ii) at least one source (NS1, NS2) other than a source (S1, S2, S3, S4) that subscribes to the registry database (20);
   actively collecting data based upon the query from the specific task sub-database (22) or the analytics-supporting general task sub-database (24), and from the at least one source (NS1, NS2) other than the source (S1, S2, S3, S4) that subscribes to the registry database (20);
   running the mapped query; and
   at least one of:
   i) repopulating a pre-existing field of the specific task sub-database (22) based upon data received from the running of the mapped query; or
   ii) depopulating or deleting a pre-existing field of the specific task sub-database (22) based upon data received from the running of the mapped query; or
   iii) creating at least one de novo field in the specific task sub-database (22); and
   populating the at least one de novo field with data retrieved from the running of the mapped query.

13. The method as defined in claim 12, further comprising:
   determining that the request entry pertains to a specific instantiation of the at least one document-based workflow;
   running the mapped query on the specific task sub-database (22) and on the at least one source (NS1, NS2) other than the source (S1, S2, S3, S4) that subscribes to the registry database (20); and
   at least one of:
   i) repopulating a pre-existing field of the specific task sub-database (22) based upon data received from the running of the mapped query; or
   ii) depopulating or deleting a pre-existing field of the specific task sub database (22) based upon data received from the running of the mapped query; or
   iii) creating at least one de novo field in the specific task sub database (22); and
   populating the at least one de novo field with data retrieved from the running of the mapped query.

14. The method as defined in claim 12, further comprising:
   determining that the request entry pertains to a general inquiry regarding the at least one document-based workflow;
   running the mapped query on the analytics-supporting general task sub-database (24) and on the at least one source (NS1, NS2) other than the source (S1, S2, S3, S4) that subscribes to the registry database (20);
   at least one of:
   i) repopulating a pre-existing field of the analytics-supporting general task sub-database (24) based upon data received from the running of the mapped query; or
   depopulating or deleting a pre-existing field of the analytics-supporting general task sub-database (24) based upon data received from the running of the mapped query; or
   iii) creating at least one de novo field in the analytics-supporting general task sub-database (24); and
   populating the at least one de novo field with data retrieved from the running of the mapped query.

15. The method as defined in claim 12, further comprising generating output, based upon the collected data, for one of a plurality of document-based workflows in the registry database (20), the output affecting a condition of the one of the plurality of document-based workflows upstream, downstream, or at a point at which the request entry is received.

16. A non-transitory computer-readable storage medium storing instructions that, when executed by a processor-based system, cause the processor-based system to perform a method for responding to a request entry, comprising:
   receiving the request entry for information related to at least one document-based workflow;
   identifying an originator of the request entry;
   determining information access rules for the identified originator;
   mapping the request entry into a query, based upon the information access rules, for i) either a specific task sub-database (22) or an analytics-supporting general task sub-database (24) of a registry database (20) and ii) at least one source (NS1, NS2) other than a source (S1, S2, S3, S4) that subscribes to the registry database (20);
   actively collecting data based upon the query from the specific task sub-database (22) or the analytics-supporting general task sub-database (24), and from the at least one source (NS1, NS2) other than the source (S1, S2, S3, S4) that subscribes to the registry database (20);

running the mapped query; and at least one of:
- i) repopulating a pre-existing field of the specific task sub-database (22) based upon data received from the running of the mapped query; or
- ii) depopulating or deleting a pre-existing field of the specific task sub-database (22) based upon data received from the running of the mapped query; or
- iii) creating at least one de novo field in the specific task sub-database (22); and populating the at least one de novo field with data retrieved from the running of the mapped query.

17. The computer-readable medium of claim 16, the method further comprising:

determining that the request entry pertains to a specific instantiation of the at least one document-based workflow;

running the mapped query on the specific task sub-database (22) and on the at least one source (NS1, NS2) other than the source (S1, S2, S3, S4) that subscribes to the registry database (20); and at least one of:
- i) repopulating a pre-existing field of the specific task sub-database (22) based upon data received from the running of the mapped query; or
- ii) depopulating or deleting a pre-existing field of the specific task sub-database (22) based upon data received from the running of the mapped query; or
- iii) creating at least one de novo field in the specific task sub-database (22); and populating the at least one de novo field with data retrieved from the running of the mapped query.

18. The computer-readable medium of claim 16, the method further comprising:

determining that the request entry pertains to a general inquiry regarding the at least one document-based workflow;

running the mapped query on the analytics-supporting general task sub-database (24) and on the at least one source (NS1, NS2) other than the source (S1, S2, S3, S4) that subscribes to the registry database (20);

at least one of:
- i) repopulating a pre-existing field of the analytics-supporting general task sub-database (24) based upon data received from the running of the mapped query; or
- ii) depopulating or deleting a pre-existing field of the analytics-supporting general task sub-database (24) based upon data received from the running of the mapped query; or
- iii) creating at least one de novo field in the analytics-supporting general task sub-database (24); and populating the at least one de novo field with data retrieved from the running of the mapped query.

19. The computer-readable medium of claim 16, the method further comprising generating output, based upon the collected data, for one of a plurality of document-based workflows in the registry database (20), the output affecting a condition of the one of the plurality of document-based workflows upstream, downstream, or at a point at which the request entry is received.

* * * * *

UNITED STATES PATENT AND TRADEMARK OFFICE
CERTIFICATE OF CORRECTION

PATENT NO. : 8,620,911 B2  Page 1 of 1
APPLICATION NO. : 13/634764
DATED : December 31, 2013
INVENTOR(S) : Steven J. Simske et al.

It is certified that error appears in the above-identified patent and that said Letters Patent is hereby corrected as shown below:

In the Claims

In column 14, line 1, in Claim 1, delete "S4" and insert -- S4) --, therefor.

In column 14, line 6, in Claim 1, delete "general" and insert -- specific --, therefor.

In column 14, line 17, in Claim 1, delete ": and" and insert -- ; and --, therefor.

In column 14, line 22, in Claim 1, delete "(NS1" and insert -- (NS1, --, therefor.

In column 14, line 29, in Claim 1, delete "it" and insert -- at --, therefor.

In column 14, line 51, in Claim 5, delete "defiled" and insert -- defined --, therefor.

In column 14, line 54, in Claim 5, delete "love." and insert -- level. --, therefor.

In column 14, line 66, in Claim 7, delete "at" and insert -- at a --, therefor.

In column 15, line 4, in Claim 8, delete "nova" and insert -- novo --, therefor.

In column 15, line 20, in Claim 9, delete "least," and insert -- least --, therefor.

In column 15, line 23, in Claim 9, delete "downstream" and insert -- downstream, --, therefor.

In column 16, line 17, in Claim 13, delete "sub" and insert -- sub- --, therefor.

In column 16, line 20, in Claim 13, delete "sub" and insert -- sub- --, therefor.

In column 16, line 36, in Claim 14, before "depopulating" insert -- ii) --.

Signed and Sealed this
Thirteenth Day of May, 2014

Michelle K. Lee
*Deputy Director of the United States Patent and Trademark Office*